United States Patent Office

2,837,122
Patented June 3, 1958

2,837,122

METHOD OF REDUCING LEAKS IN CONDUITS

Fred B. Shaw, Jr., and Ellsworth Ungethuem, Milwaukee, Wis., assignors of four-fifths to said Ungethuem and one-fifth to said Shaw, Jr.

No Drawing. Continuation of application Serial No. 434,330, June 3, 1954. This application June 28, 1956, Serial No. 594,389

8 Claims. (Cl. 138—97)

This invention relates to a method of reducing leaks in conduits, particularly utility conduits formed of joined sections of cast iron, steel, ceramic or plastic material or similar piping. More especially this invention relates to a process for reducing leaks in utility conduits which occur in the pipe joints or in the pipe walls. The leaks may be reduced partly or completely. This application is a continuation of applicants' copending application Serial No. 434,330, filed June 3, 1954, now abandoned.

Joined lengths of pipe are used as utility conduits for gases and liquids. Such conduits are frequently placed beneath the surface of the ground and are often placed below the frost line which varies with the climate. Often these pipes are below paved and well traveled streets. Utility pipes such as those used for carrying gas are usually of the bell and spigot type. The pipes are joined by successively inserting a spigot into a bell, driving a packing material such as jute into the space between the bell and spigot and sealing the jute in position with molten lead or a plastic mixture of cement and water placed in the outer portion of the space between the bell and spigot. One of the chief problems in maintaining utility conduits is that leaks frequently occur in these conduits especially at the joints where the units of the conduit or the pieces of pipe are united. In addition, leaks such as small holes frequently occur in the walls of the pipe. These holes are caused by original defects in the pipe, by local corrosion, or by cracking. The repair of such leaks is important both because of the value of the fluid handled and because escape of the fluid frequently causes hazardous conditions.

In the past, leaks in utility pipe have been repaired by digging up and replacing the defective sections, by applying leak clamps to defective joints and split sleeves to straight sections, or by surrounding the defective sections with concrete or similar materials.

Repairs in a defective system have also been made by applying a concrete lining to the inner surface of all the pipes in a system. This method, although effective, requires special equipment and reduces the capacity of the system. Another method of temporarily reducing leakage which has been proposed is the flooding of the utility pipes with a waxy solution which swells the packing material in the joint.

Leaks in pipes which transmit anhydrous substances, such as natural gas, have been found particularly difficult to reduce for any substantial length of time. Materials used to stop the leakage have tended to dry out and crack, thus preventing repairs of any permanency.

The present invention is based on the discovery that leaks in joints of metal and non-metal utility lines and small openings in the walls of the pipe can be quickly and permanently repaired in situ while maintaining the original capacity of the utility system. Permanency of the repairs does not depend on moisture conditions within the pipe.

The method of the invention comprises the steps of:

(a) Filling the pipe system with a resealing material of the class consisting of stable colloidal dispersions of cement, clay, bituminous material, or water soluble and precipitable organic polymers having free hydroxyl or free carboxyl groups, such as certain polyvinyl acetate or methyl celluloses, (b) Applying a hydraulic or other type of suitable superatmospheric internal pressure to the resealing material for at least ten minutes, (c) Withdrawing a substantial portion of the dispersion solution by pump or other means so that a portion of the solution remains adjacent and/or in the openings desired to be repaired, (d) Introducing an aqueous solution of an electrolyte such as a magnesium, iron or aluminum salt so that it fills the pipe system, (e) Applying a hydraulic or other type of suitable superatmospheric internal pressure to the electrolyte solution for at least ten minutes, and (f) Withdrawing the electrolyte solution by pump or other means.

A pressure of from five to one hundred pounds per square inch gauge applied to the resealing material and to the electrolyte solution has been found satisfactory.

When the leak has occurred in a packed joint, it is desirable to initially apply a suitable internal pressure to the pipe joint for five minutes or more, depending on the dimensions, composition and condition of the pipe and sealing material. This initial application of pressure can be applied by filling the system with a suitable hydraulic fluid under pressure and will tighten the packing material in the joint and will produce at least a partial leak reduction. It has been found that advanced superatmospheric pressures of from 100 to 1000 pounds per square inch gauge applied between five minutes and one hour are satisfactory. If the initial pressurization is not used, the pressure used in applying the resealing material will have some effect on tightening the packing.

The types of colloidal dispersions given as illustrations are of the class which do not dry out to any great degree under anhydrous or dry conditions. In referring to precipitable organic polymers, the word "precipitable" refers only to that class of organic polymers which may be dispersed in a liquid such as water and subsequently precipitated either in the original chemical form or as a salt of the original polymer molecule. The electrolytes used are preferably of the class having multi-valent cations which have a relatively high electrical charge.

Applying the colloidal dispersion under pressure allows penetration of the openings in the line which produce the leaks. The packing material will also be impregnated thereby. When the bulk of the dispersion solution is removed, a portion of the dispersion solution will remain in the openings and packing material due to capillary action and surface tension, regardless of the angle of the pipe. That portion of the solution adjacent the large inner surfaces of the pipe will drain away, since there will not be enough surface tension to hold it. Introduction of the electrolyte under pressure will bring the electrolyte in contact with the remaining dispersion solution and will cause precipitation of the dispersed particles to fill and seal the openings and packing. Precipitation is caused by the fact that the particles in the colloidal dispersion are oppositely charged relative to at least a portion of the ions of the electrolyte. The charge on the dispersed particles is neutralized by the oppositely charged ions of the electrolyte and the dispersed particles hence will coalesce and precipitate out. There is no dependence on the composition of the conduit or on any kind of external electromotive force. The composition of the pipe and joints is therefore of little importance in carrying out the process.

It is advisable when correcting leakage in a system of an unknown physical condition to first sweep the line with water or other suitable fluid to remove dirt and other sediment and to then pressure test the line at a slightly superatmospheric pressure to determine the rate of leakage. An excessive rate of leakage indicates a grossly damaged or perforated pipe which must be excavated and repaired or replaced.

The following three examples illustrate utilization of the process in repairing pipe lines when leakage at the joint is appreciable.

*Example Number 1*

A 4 inch diameter section of gas main incorporating a leaking bell and spigot joint was removed from service after 56 years of service and sealed at both ends. The leakage rate through the joint when pressurized at 20 pounds per square inch gauge with air had been determined to be 1.5 cubic feet per hour. Soapy-water tests demonstrated that there were 5 individual leaks through the joint, one of which was appreciably more severe than the others. The section was filled with an aqueous solution containing 0.2% ammonium hydroxide and 5% of a water soluble polyvinyl acetate polymer and subjected to an internal hydraulic pressure of 20 pounds per square inch gauge. The pressure was maintained for approximately 20 minutes, during which period liquid seepage through the pipe joint was observed. The solution was then removed and replaced with a 5% aqueous solution of magnesium sulphate, and again subjected to a hydraulic pressure of 20 pounds per square inch gauge, which was also maintained for 20 minutes. At first, some liquid seepage through the joint was also noted, but this soon ceased. When the system was cleared of the second solution and again pressurized with air at 20 pounds per square inch gauge, no leaks could be detected over a 24 hour period, either by means of the soapy-water test or by an observable drop in a pressure gauge reading. The joint was then sectionalized or cut through and it was observed that a hair line crack between the lead and the pipe body was filled with the precipitated polymer. Likewise, the jute in the joint as the sealing material was well compacted and contained appreciable amounts of precipitated and compacted polymer between the fibers.

*Example Number 2*

A 4 inch diameter section of gas main incorporating a leaking bell and spigot joint which was originally sealed with jute and lead was removed from service and sealed at both ends. The leakage rate through the joint when pressurized at 20 pounds per square inch gauge with air was determined to be 8.4 cubic feet per hour.

The section was then filled with water containing 0.1% by weight of a surface active agent, Igepon, and superatmospheric hydraulic pressure of 600 pounds per square inch gauge was applied to the system for about ten minutes. After draining the liquid from the line, it was again tested at 20 pounds per square inch gauge with air, and a leakage rate of 0.35 cubic foot per hour was noted.

To eliminate the remaining leakage, the section was then filled with an ammonical aqueous solution of a water soluble polyvinyl acetate polymer and subjected to a hydraulic pressure of 20 pounds per square inch gauge. The pressure was maintained for approximately 15 minutes, during which period liquid seepage through the pipe joint was noted. The polymer solution was then removed and replaced with a 5% aqueous solution of aluminum sulphate, and again pressurized to 20 pounds per square inch gauge for a period of 15 minutes. Liquid seepage through the joint was observed for approximately 3 minutes of this phase, but not thereafter. When this second solution was removed from the pipe and the system again pressurized to 20 pounds per square inch gauge with air, no leakage could be detected over a 24 hour period, either by the soapy-water test or by an observable pressure gauge fluctuation.

*Example Number 3*

A 6 inch diameter section of gas main incorporating a leaking bell and spigot joint which was originally sealed with jute and cement was removed from service and sealed at both ends. The leakage rate through the joint when pressurized at 20 pounds per square inch gauge with air was determined to be 6.9 cubic feet per hour.

The section was then filled with water containing 0.1% of a surface active agent, Marasperse, and a hydraulic pressure of 400 pounds per square inch gauge was applied to the system. After draining the liquid from the line, it was again tested at 20 pounds per square inch gauge with air, and a leakage rate of 1.3 cubic feet per hour was observed.

The section was then filled with a dispersion of cement in water, containing about 5% by weight of cement and stabilized with 0.1% of a surface active agent, Marasperse. A hydraulic pressure of 20 pounds per square inch gauge was applied to the line for a period of 15 minutes, after which the line was drained. The pipe was then filled with a 5% aqueous solution of aluminum sulphate, and again pressurized to 20 pounds per square inch gauge, for a period of 15 minutes. Seepage of liquid from the joint, which was noticeable at first, rapidly subsided. When the solution of the electrolyte was removed from the system and the pipe again tested with air at 20 pounds per square inch gauge, no leakage could be detected over a 24 hour period, either by the soapy-water test or by pressure drop as recorded by a gauge.

The following example illustrates the effectiveness of the method in sealing holes in the wall of pipe.

*Example Number 4*

A piece of two-inch black iron pipe was drilled completely through in two places. One hole was made with a .031 inch drill and one hole was made with a .028 inch drill. The drilled pipe was closed at both ends and pressurized at 20 pounds per square inch gauge. Soapy-water tests demonstrated a severe leak through each of the drilled holes.

The drilled pipe was then filled with an ammonical aqueous solution of a water soluble polyvinyl acetate polymer and subjected to a hydraulic pressure of 20 pounds per square inch gauge for about twenty minutes. The polymer solution was then removed and replaced with a 5% aqueous solution of aluminum sulphate, and again pressurized to 20 pounds per square inch gauge for about twenty minutes. The pipe showed no leakage at 20 pounds per square inch gauge during a two-hour period either by the soapy-water tests or by observable pressure gauge fluctuation.

The invention provides a novel method of sealing leaks in conduits or the like, regardless of the composition of the conduit. The colloidal dispersion is of such a nature that drying out of the precipitate is substantially non-existent. In this regard the use of soluble precipitable organic polymers are preferred, although dispersions of clay, cement or bituminous materials have been found to be adequate.

The colloidal dispersions used have properties of surface tension and viscosity such that the dispersion will not cling to the conduit walls but will readily penetrate and remain in cracks. The original precipitate has little tendency to adhere to large surfaces.

No electrical apparatus is necessary. Precipitation is accomplished by utilizing the electrical charges inherent in both the dispersed material and the electrolyte.

Various modes of carrying out the invention are contemplated as being within the scope of the following claims particularly pointing out and distinctly claiming the subject matter which is regarded as the invention.

We claim:

1. A method of sealing a leak in a conduit or the like, comprising introducing a fluid under pressure into said conduit with said fluid having a precipitable resealing material therein, withdrawing a substantial portion of said fluid from the conduit while allowing a portion of the fluid to remain adjacent the leak, and precipitating out the resealing material in said remaining fluid so that the precipitated material is deposited in the leak to seal the conduit against further leakage.

2. A method of sealing a leak in a conduit or the like, comprising introducing a fluid under pressure into said conduit with said fluid having a precipitable resealing material therein, withdrawing the bulk of said fluid from the conduit while allowing a portion of the fluid to remain adjacent the leak, and introducing an electrolyte under pressure into said conduit whereby the resealing material in said remaining fluid is precipitated out so that the precipitated material is deposited to seal the leak against further leakage.

3. A method of sealing a leak in a conduit or the like, comprising introducing into said conduit a fluid having a stable colloidal dispersion of a resealing material therein, applying pressure to said fluid to penetrate the fluid into said leak, withdrawing the bulk of said fluid from the conduit with a portion of the fluid remaining adjacent said leak, and introducing an electrolyte under pressure into said conduit and into contact with said remaining fluid to precipitate the dispersed material into the leak to seal the leak.

4. A method of resealing a packed joint in a conduit or the like, comprising applying an initial pressure to said joint to tighten the packing material, withdrawing said pressure, introducing a fluid having a stable colloidal dispersion of a resealing material therein into said conduit, applying pressure to said fluid to penetrate fluid into the joint, withdrawing the bulk of said fluid from the conduit with a portion of the fluid remaining in said joint and said packing material, and introducing an electrolyte under pressure into said conduit so that the electrolyte contacts said remaining fluid and precipitates out the dispersed material to seal the joint.

5. A process for reducing leaks in a conduit comprising applying an internal advanced superatmospheric pressure of from 100 to 1000 pounds per square inch gauge for less than an hour, filling the conduit with a resealing material, applying an internal superatmospheric pressure of from 5 to 100 pounds per square inch gauge for at least ten minutes, withdrawing a portion of the resealing material, introducing an electrolyte into the conduit, and maintaining the electrolyte at a superatmospheric pressure of from 5 to 100 pounds per square inch gauge for at least ten minutes.

6. A process for reducing leaks in a conduit formed of bell and spigot joints of pipes which comprises applying an internal advanced superatmospheric pressure of about 600 pounds per square inch gauge for 10 minutes, filling the conduit with an ammonical aqueous solution of a water-soluble polyvinyl acetate polymer, applying an internal pressure of 20 pounds per square inch gauge for 15 minutes, withdrawing a portion of the water-soluble polyvinyl acetate polymer, introducing an aqueous solution of aluminum sulphate into the conduit and applying a superatmospheric pressure of 20 pounds per square inch gauge for 15 minutes.

7. A process for reducing leaks in a conduit comprising filling the conduit with a resealing material, applying an internal superatmospheric pressure of from 5 to 100 pounds per square inch gauge for at least ten minutes, withdrawing a portion of the resealing material, introducing an electrolyte into the conduit, and maintaining the electrolyte at a superatmospheric pressure of from 5 to 100 pounds per square inch guage for at least ten minutes.

8. A process for reducing leaks in a conduit comprising filling the conduit with an ammonical aqueous solution of a water-soluble polyvinyl acetate polymer, applying an internal superatmospheric pressure of about 20 pounds per square inch gauge for about 20 minutes, withdrawing a portion of the resealing material, introducing an aqueous solution of aluminum sulphate into the conduit, and maintaining a superatmospheric pressure of about 20 pounds per square inch gauge for about 20 minutes.

References Cited in the file of this patent

UNITED STATES PATENTS

| | | |
|---|---|---|
| 2,188,311 | Reimers | Jan. 30, 1940 |
| 2,302,913 | Reimers | Nov. 24, 1942 |
| 2,391,737 | Pabst | Dec. 25, 1945 |
| 2,554,250 | Horstman et al. | May 22, 1951 |